United States Patent [19]
Thier et al.

[11] Patent Number: 6,019,566
[45] Date of Patent: Feb. 1, 2000

[54] GREENSMOWER TRAILER

[75] Inventors: Richard David Thier, Juneau, Wis.;
Donald Emil Niosi, Prior Lake, Minn.

[73] Assignee: Deere & Company, Moline, Ill.

[21] Appl. No.: 09/131,195

[22] Filed: Aug. 7, 1998

[51] Int. Cl.[7] .................................................. B60P 3/07
[52] U.S. Cl. ............................................. 414/537; 410/3
[58] Field of Search .................................. 414/537, 482; 410/3

[56] References Cited

U.S. PATENT DOCUMENTS

| | | | |
|---|---|---|---|
| 4,032,167 | 6/1977 | Chereda | 414/537 X |
| 4,514,132 | 4/1985 | Law et al. | 414/537 |
| 5,044,845 | 9/1991 | Baker, Jr. | 410/3 |
| 5,503,449 | 4/1996 | Cameron et al. | 296/39.1 |

OTHER PUBLICATIONS

Cultural Turf Technologies, Inc., LoPro 6042 Trailer brochure, two pages, publication date—unknown, published in the U.S.A.
Smithco, Mow–n–Go brochure, two pages, publication date—unknown, published in the U.S.A.
Bell Turf Equipment Mfg., Mower Mate brochure, two pages, publication date—unknown, published in the U.S.A.
Deere & Company, Golf and Turf Equipment Purchasing Guide, three pages, publication date—unknown, published in the U.S.A.
Deere & Company, 220A Walk Behind Greensmower brochure, two pages, publication date—1996, published in the U.S.A.
Deere & Company, Golf and Turf Sales Manual, eleven pages, publication date—1997, published in the U.S.A.

*Primary Examiner*—Steven A. Bratlie

[57] ABSTRACT

A trailer adapted for transporting a pair of walkbehind greensmowers, having a first bracket which receives the first greensmower's front roller for blocking forward or upward movement of the first greensmower's front roller, at least one first rear arm pivotally coupled with the trailer and pivotable to a lowered position beneath the trailer floor whereat clearance is provided for the first greensmower to be rolled into position on the floor of the trailer, the first rear arm also being pivotable to a raised position whereat the first rear arm is abutable with a rear portion of the first greensmower for blocking the first greensmower from shifting rearwardly. A second bracket is fixed to a first rear arm for pivotal motion therewith, and is positioned behind the first greensmower for receiving the second greensmower's front roller for blocking forward and upward movement of the second greensmower's front roller. A second rear arm is pivotable between a lowered position beneath the trailer floor for providing clearance for the first and second greensmower to be rolled into position on the floor of the trailer, and a raised position whereat the second rear arm is abutable with a rear portion of the second greensmower for blocking the second greensmower from shifting rearwardly. First and second levers are engagable by an operator for swinging the respective first and second rear arms between their raised and lowered positions. A pivotable ramp is operatively coupled with the second lever for pivoting between raised and lowered positions as the second lever swings the second rear arm between raised and lowered positions.

19 Claims, 3 Drawing Sheets

GREENSMOWER TRAILER

BACKGROUND OF THE INVENTION

The present invention relates to trailers used for transporting walkbehind greensmowers between locations such as greens on a golf course.

Walkbehind greensmowers are used to mow or cut grass very accurately and precisely. Walkbehind greensmowers are reel type mowers, and cut grass with a shearing action between a stationary bedknife and the blades of a cylindrical rotating cutting reel. The cutting reel and bedknife are supported between front and rear ground engaging rollers. The height at which the rollers supports the reel and bedknife above the ground determines the height at which the grass is cut. This cutting height can be adjusted and controlled very accurately and precisely for cutting finely manicured turf areas such as golf course greens.

Golf courses include greens which define relatively smooth surfaces on which relatively short grass is maintained. These greens are often mowed daily with a self-propelled walkbehind greensmower. The various greens on a golf course are often separated from each other by several hundred yards, and therefore it is known to load the greensmower onto a trailer or in the bed of a vehicle and drive between greens to reduce the transport time between greens. Reducing transport time between greens increases efficiency and allows the operator to mow more greens in a shorter amount of time. Often two operators will be mowing greens together to further reduce the amount of time the greens are being mowed. Therefore a pair of walkbehind greensmowers are often transported simultaneously by the trailer or vehicle.

Typical greensmowers include a pair of tires that can be mounted to the central shaft of the rear ground engaging roller. The tires have a larger diameter than the rear roller and, therefore, when installed on the greensmower allow an operator to propel the greensmower about on the tires. This is generally quicker than walking the greensmower about on its rollers. Furthermore, use of the tires helps keep the greensmower properly adjusted at the desired cutting height, whereas transport over long distances on the rollers can tend to affect or alter the cutting height adjustment. When transporting greensmowers across relatively long distances such as between greens of a golf course, it is most desirable to transport the greensmowers in a trailer or vehicle, which tends to keep the greensmower in adjustment better than if the greensmower is walked between greens on its rollers or tires. Therefore, for the various reasons stated above, operators typically transport greensmowers between greens using a trailer or other vehicle. Some operators transport the greensmowers with the tires off, others transport the greensmowers with the tires installed.

Several different types of vehicles have been used to transport walkbehind greensmowers between golf course greens. Often an all-purpose trailer is used that has a flat bed. The greensmowers are walked up onto the flat bed of the trailer for transport. The greensmowers are generally not secured in any way, and can tend to bounce around on the bed of the trailer. This can cause the greensmowers to be jarred out of the preselected precise cutting height adjustment.

It is known to provide trailers that include mechanisms for securing the greensmowers in place on the trailer during transport. The latching operation can often be a relatively difficult or awkward procedure for an operator. Conventional trailers are typically designed to accommodate a specific brand and size of greensmower since the securing mechanisms are sized to latch onto particular portions of a particular greensmower. Therefore these trailers can generally only carry a very limited number of sizes of greensmower, and are generally not adapted for transporting greensmowers of different sizes and shapes. Furthermore, these trailers tend to be designed specifically for carrying the greensmower with the tires detached from the greensmowers. Conventional trailers are generally not adapted to transport greensmowers either with or without transport tires mounted on the greensmowers.

It would therefore be desirable to provide a greensmower trailer that is adapted to transport one or two greensmowers quickly between greens on a golf course. It would be desirable for such a trailer to firmly secure the greensmowers to the trailer so that they do not bounce around during transport and are not knocked out of their precise preselected cutting height adjustment. It would be desirable for such a trailer to be adapted for transporting greensmowers of different sizes and shapes, and with the transport tires either installed or removed from the greensmowers.

SUMMARY OF THE INVENTION

According to the present invention, a greensmower trailer is provided for transporting one or two walkbehind greensmowers. The trailer includes a first bracket into which the front roller of a greensmower can be positioned. To secure this greensmower in position on the front of the trailer the operator pivots a first lever forwardly to a latched position, which causes a pair of first rear arms to swing upwardly and abut a rear portion of the front greensmower. The first rear arms prevent the front greensmower from shifting rearwardly and therefore ensure that the front roller remains within the bracket. The bracket prevents the front roller and front portion of the greensmower from bouncing upwardly as the trailer travels over bumpy terrain. The rear of the greensmower is relatively heavy and is therefore not required to be aggressively confined vertically. A second or rear greensmower can also be carried by the trailer according to the preferred embodiment. It is walked up the ramp and onto the floor of the trailer until its front roller is positioned within a second bracket that is fixed with one of the first rear arms. The rear greensmower is secured in place as the operator swings a second lever forwardly to a latched position. This causes a pair of second rear arms to swing upwardly into abutment with the rear of the rear greensmower. The second bracket and rear arms confine or secure the rear greensmower against movement in a manner similar to how the front greensmower is held in place by the first bracket and first rear arms. Movement of the second lever toward the latched position also causes the ramp to swing upwardly to its raised transport position.

The rear arms of the trailer according to the present invention confine the greensmower horizontally, but do not aggressively confine the greensmowers in the vertical direction. This allows the rear arms to merely abut a rear portion of the greensmower in order to cause the greensmower to be secured in position on the trailer floor by way of the bracket and rear arms. Since the rear arm need not contact or engage the greensmower at a particular precise location, different sized greensmowers can be carried on the trailer and latched in position. Furthermore, since the rear arms merely abut the rear portion of the greensmower, the greensmowers can be carried on the trailer with their transport tires either on or off. The rear arms will abut a rear portion of the greensmower whether the tires are on or off the greensmower, and the front roller of the greensmower is thereby securely confined within the bracket for securing the greensmower during transport.

To unload the greensmowers from the trailer the operator unlatches the second lever and swings it upwardly and rearwardly, which causes the ramp to drop to its lowered position in contact with the ground surface. This pivoting of the second lever also swings the second rear arms rearwardly and downwardly to positions beneath the floor and ramp, which provides clearance for the rear greensmower to be rolled rearwardly down the ramp. The operator can then unlatch the first lever and swing the first lever upwardly and rearwardly, which causes the first rear arms to swing rearwardly and downwardly beneath the floor of the trailer. This provides clearance for the front greensmower to be rolled rearwardly across the trailer floor and down the ramp.

The trailer according to the present invention therefore allows a pair of greensmowers to be carried by the trailer and securely latched in place. It is relatively simple and easy for an operator to latch the greensmowers in place by manipulating the first and second levers. The ramp is operatively coupled with the second lever and shifts between positions as the second lever is pivoted. Therefore the second lever serves the dual function of swinging the second rear arms into position and raising the ramp to its raised transport position. This dual function of the second lever facilitates ease of operation. The brackets and rear arms function to allow greensmowers of different shapes and sizes to be carried by and secured to the trailer. Furthermore, the bracket and rear arms will secure a greensmower in place whether the greensmower has its transport tires installed or removed. The greensmowers are carried by the floor of the trailer in staggered relation to each other so that the handle of the front greensmower will not contact the body or engine of the rear greensmower. This allows the trailer to be relatively compact from front to rear, which reduces the length of the trailer and increases maneuverability.

DESCRIPTION OF THE PREFERRED EMBODIMENT

Figure 1:
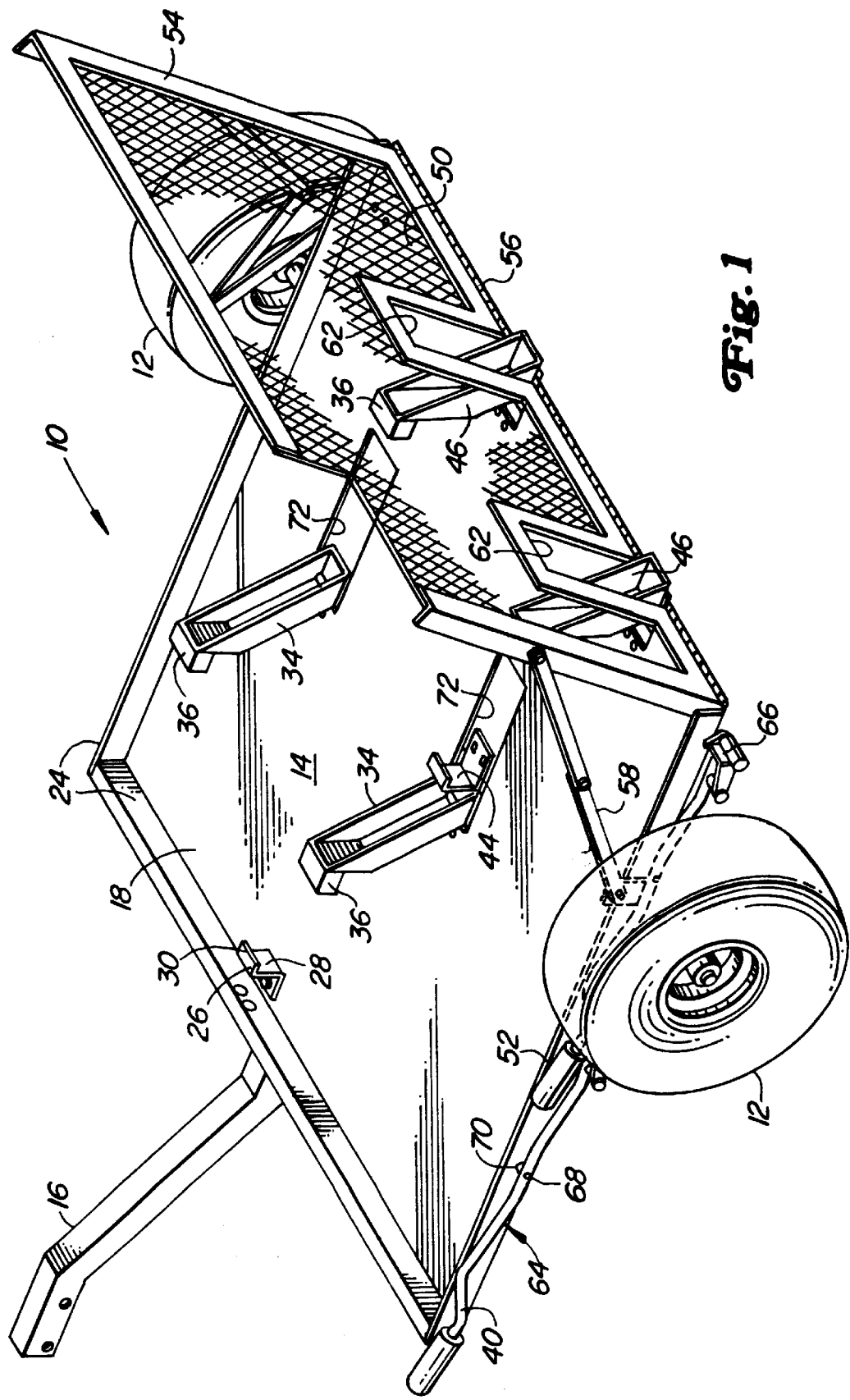
FIG. 1 is a perspective view of the greensmower trailer according to the present invention, showing the first and second levers in their forward latched positions, the first and second rear arms in their raised positions, and the ramp in its raised transport position.
Figure 2:
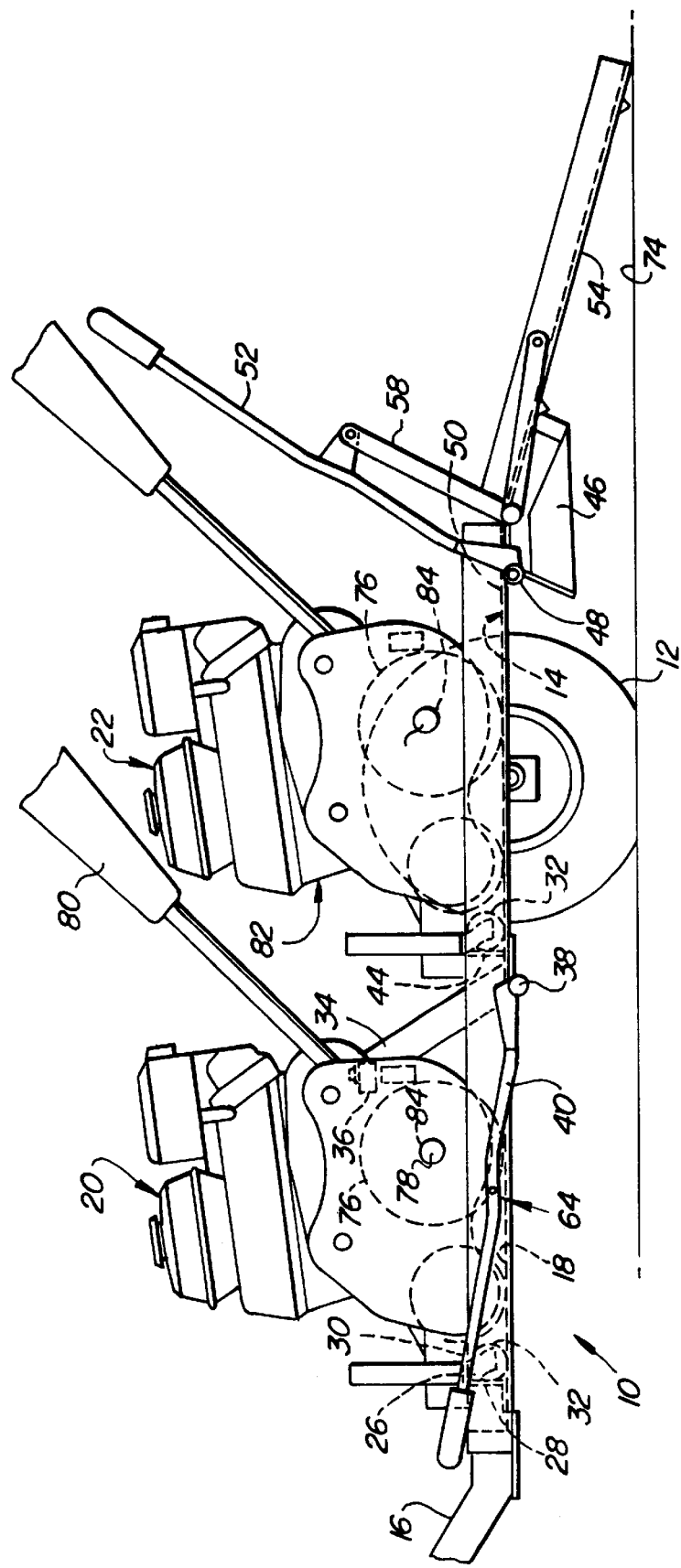
FIG. 2 is a side view of the trailer according to the present invention showing first and second greensmowers in position on the trailer with the first lever and first rear arms in their forward latched positions. The second lever is in its raised and unlatched position with the ramp resting on the ground surface and the second rear arms in their lowered position beneath the floor and ramp.
Figure 3:
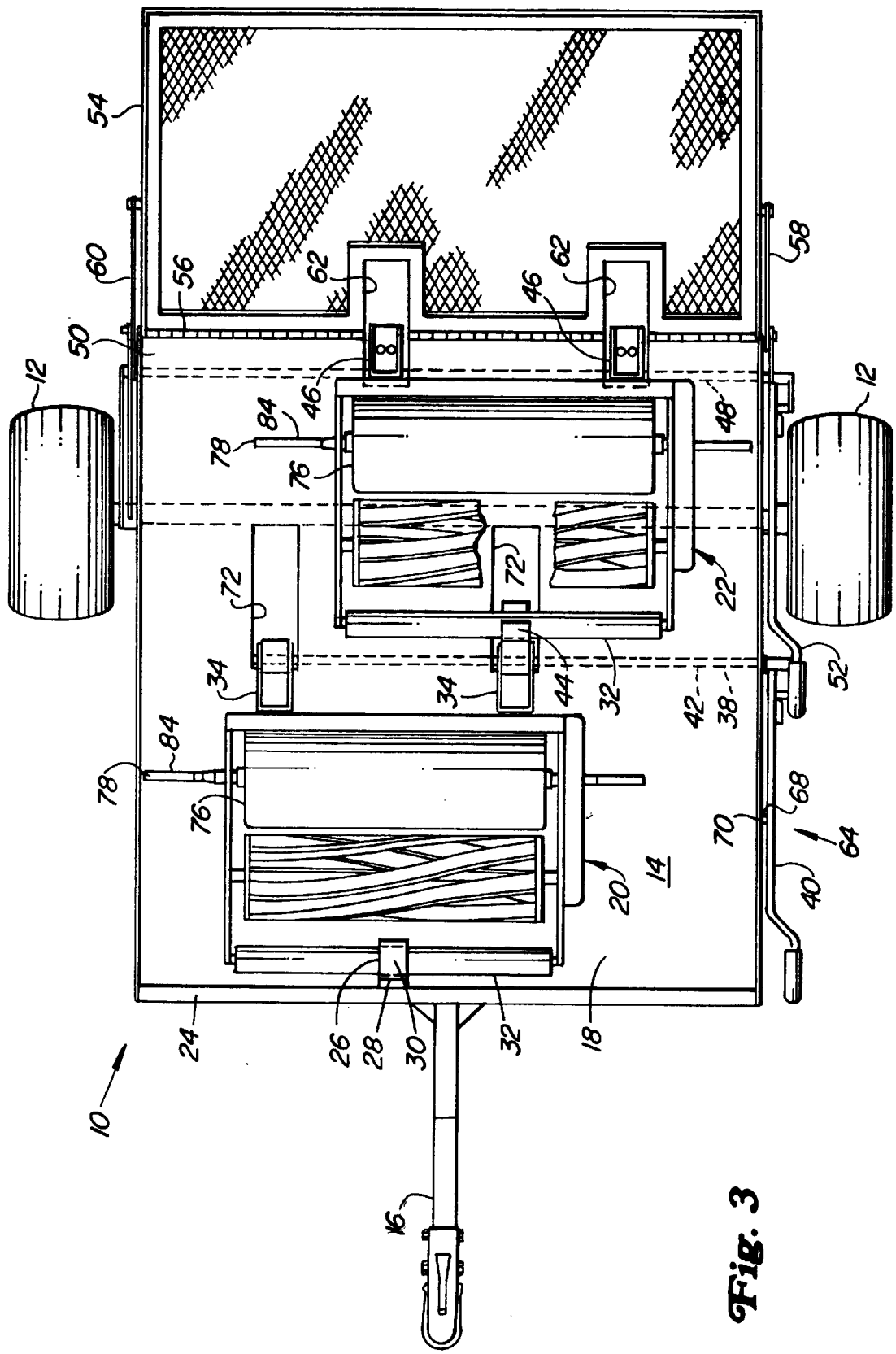
FIG. 3 is a plan view of the trailer showing front and rear greensmowers laterally staggered with respect to each other on the floor of the trailer. The greensmowers are shown with their transport tires removed from the central shafts which extend outwardly from the rear rollers.

Referring now to FIGS. 1–3, there is shown a greensmower trailer 10 according to the preferred embodiment of the present invention. The trailer 10 includes a pair of ground engaging wheels 12 and a floor portion 14 extending laterally between the wheels 12. A hitch bar 16 is provided at the front 18 of the floor portion 14 and allows the trailer 10 to be coupled with a vehicle for towing the trailer 10 and greensmowers 20 and 22 between greens on a golf course. A frame structure 24 is provided which generally rigidifies the floor 14 and trailer 10.

The present invention provides a system for securing one or two greensmowers to the trailer 10 for transport. A first bracket 26 is fixed to the trailer 10 near the front 18 of the floor portion 14. The first bracket 26 includes a front portion 28 and a top portion 30. When a greensmower 20 is rolled onto the floor 14 of the trailer 10 the first bracket 26 receives the greensmower's front ground engaging roller 32. The first bracket 26 generally confines the movement of the front roller 32. The front portion 28 blocks the front roller 32 from shifting forwardly and the top portion 30 blocks the front roller 32 from shifting upwardly.

A pair of first rear arms 34 having bumper members 36 are mounted to a first shaft 38 that extends laterally beneath the floor portion 14 of the trailer 10. A first hand engagable lever 40 is operatively fixed with the left end portion 42 of the first shaft 38. When the greensmower 20 has been rolled onto the floor 14 of the trailer 10 such that the greensmower's front roller 32 is positioned within the front bracket 26, the operator can pivot the first lever 40 downwardly to the position shown in FIG. 1 which causes the first rear arms 34 to swing upwardly to the position shown in FIG. 1. In that position the first rear arms 34 abut rear portions of the first greensmower 20 and thereby prevent the first greensmower 20 from shifting rearwardly, as will be described in greater detail below.

The preferred embodiment of the present invention also provides a system for securing a second greensmower 22 to the trailer 10 for transport. The second greensmower 22 is carried on the floor 14 of the trailer 10 to the rear of and laterally offset from the first greensmower 20. A second bracket 44 is fixed with one of the first rear arms 34. The second bracket 44 includes front and top portions 28 and 30 similar to the first bracket 26 for restricting movement of the second greensmower's front roller 32 in the forward and upward direction. A pair of second rear arms 46 with bumper members 36 are fixed with a second shaft 48 pivotally supported beneath the floor portion 14 near the rear edge 50 of the trailer 10. A second hand engagable lever 52 is operatively coupled with the second shaft 48 and can be manipulated by an operator for swinging the second rear arm members 46 between their raised and lowered positions. In the raised position the second rear arms 46 abut a rear portion of the second greensmower 22 for blocking the second greensmower 22 from shifting rearwardly from its transport position.

A ramp 54 is pivotally mounted by way of a hinge mechanism 56 to the rear 50 of the trailer's floor 14. The ramp 54 is operatively coupled with the second hand lever 52 by way of a left linkage 58 on the left side of the trailer 10, and is coupled with the second shaft 48 by way of a right linkage 60 on the right side of the trailer 10. The right and left linkages 60 and 58 operate to cause the ramp 54 to swing between its raised and lowered positions when the operator manipulates the second lever 52. Slots 62 are defined in the ramp 54 to allow the second rear arms 46 to pivot downwardly through the slots 62 to a position beneath the ramp 54 when the ramp 54 is in the lowered position, as will be described in greater detail below.

The preferred embodiment includes latch mechanisms 64 that operate to secure the levers 40 and 52 in the positions shown in FIG. 1. To latch the levers 40 and 52 in the positions shown in FIG. 1 an operator swings the levers 40 and 52 forwardly and downwardly, and pulls the levers 40 and 52 laterally outwardly to the right of the trailer 10. A hinge mechanism 66 which couples the lever 40 or 52 with the shaft 38 or 48 allows the lever 40 or 52 to swing laterally with respect to the trailer 10. The operator can then align a peg 68 fixed to the lever 40 or 52 with an opening 70 defined in the frame structure 24 of the trailer 10. A compression spring urges the lever 40 or 52 laterally inwardly toward the trailer 10 and thereby serves to bias the peg 68 into the opening 70 for retaining the lever 40 or 52 in its latched configuration. To unlatch a lever 40 or 52 the operator pulls the lever 40 or 52 laterally outwardly to the left of the trailer 10 and against the force of the spring until the peg 68 is removed from the opening 70. The operator can then pivot the lever 40 or 52 upwardly which will cause the rear arms 34 or 46 and/or ramp 54 to swing to their lowered positions.

Next, the operation of the greensmower trailer 10 according to the present invention will be described in greater detail. To load the greensmowers 20 and 22 onto the trailer 10 the first and second levers 40 and 52 must be pivoted to their raised position. FIG. 2 shows the second lever 52 in its raised position. To swing the levers 40 and 52 to their raised positions the operator can unlatch the levers 40 and 52 by pulling each lever 40 and 52 laterally outwardly to the left of the trailer 10 until the peg 68 shifts out of the opening 70. With the peg 68 out of the opening 70 there is clearance for the lever 40 or 52 to shift upwardly to a raised position. As the first lever 40 swings up to the raised position the first shaft 38 and first rear arm members 34 pivot therewith. The first rear arm members 34 swing rearwardly and downwardly from their position shown in FIG. 1 until they pass through slots 72 formed in the floor portion 14 of the trailer 10. Positioned beneath the floor 14 of the trailer 10 the first rear arm members 34 provide clearance for a greensmower 20 to be rolled onto the front portion 18 of the trailer's floor 14.

To load greensmowers 20 and 22 onto the trailer 10 the second lever 52 must also be swung upwardly to its raised position shown in FIG. 3. To do this the operator unlatches the second lever 52 by pulling the second lever 52 laterally outwardly to the left from the trailer 10 and swings the second lever 52 upwardly. The second shaft 48 and second rear arms 46 are rigidly fixed for pivoting motion with the second lever 52. The ramp 54 is also coupled with the second lever 52 by way of the right and left linkages 60 and 58, and therefore the ramp 54 will begin to swing downward to its lowered position when the second lever 52 begins pivoting upwardly away from its latched position. The ramp 54 continues to swing downwardly and rearwardly with the second lever 52 until the ramp 54 contacts the ground surface 74, which stops the ramp 54 from pivoting further in that direction. The right and left linkages 60 and 58 allow the second lever 52 to continue to swing rearwardly once the ramp 54 contacts the ground surface 74. The second lever 52 continues to swing rearwardly until the second rear arms 46 swing rearwardly and downwardly through the slots 62 formed in the ramp 54. With the rear arms 46 positioned beneath the ramp 54, the greensmowers 20 and 22 can roll up the ramp 54 and onto the floor 14 without being blocked by interference with the second rear arms 46.

With both levers 40 and 52 in their raised positions, the ramp 54 resting on the ground 74, and the rear arm members 34 and 46 positioned beneath the floor of the trailer, the operator can then roll a first greensmower 20 onto the trailer 10. The greensmower 20 can be rolling onto the trailer 10 on either its transport wheels or its rear roller 76. As the first greensmower 20 is walked up the ramp 54 and onto the trailer floor 14, it will pass directly above the second rear arms 46, which are positioned out of the way beneath the upper surface of the ramp 54. Once positioned on the trailer floor 14, the first greensmower 20 can be rolled to the front 18 of the floor 14. The first greensmower 20 passes directly above the first rear arms 34 as the greensmower 20 rolls forwardly on the floor portion 14, since the first rear arms 34 are positioned beneath the upper surface of the floor 14. The operator continues to walk the first greensmower 20 forwardly until the front roller 32 of the first greensmower 20 is positioned within the first bracket 26 at the front 18 of the trailer 10. The operator can then secure the first greensmower 20 in place by pivoting the first lever 40 forwardly and downwardly until it is latched. As the operator pivots the first lever 40 forwardly and downwardly the first shaft 38 and first rear arms 34 pivot therewith until the first lever 40 is latched by pulling the first lever 40 outwardly against the bias of the spring and positioning the peg 68 in the opening 70. When this latched position is achieved the bumpers 36 of the first rear arms 34 are abutable with a rear portion of the first greensmower 20. The first rear arms 34 do not aggressively confine the rear of the greensmower 20 from shifting upwardly. Confinement of the rear of the greensmower 20 in the vertical direction is generally not required since the rear portion of the greensmower 20 is relatively heavy and does not tend to bounce up during transport. The front roller 32 of the greensmower 20 is restricted from shifting upwardly by the top portion 30 of the first bracket 26. The front portion of the greensmower 20 is relatively light, and may tend to bounce up during transport over rough or bumpy terrain. Greensmowers tend to swing upwardly about the axis 78 of their rear rollers 76 or tires during transport on trailers. The present invention generally prevents this by confining the front roller 32 within a bracket 26 and thereby blocking the front portion of the greensmower 20 from bouncing upwardly. The front portion of the greensmower 20 could bounce upwardly in this manner if it shifted rearwardly out of engagement with the bracket 26, but the presence of the first rear arms 34 blocks the greensmower 20 from shifting far enough to the rear to allow the front roller 32 to shift upwardly out of the first bracket 26.

A second greensmower 22 can then be rolled up onto the trailer 10 for transport between greens. The second greensmower 22 is walked up the ramp 54 by the operator, and can be rolled on either its wheels or the rear roller 76. As the second greensmower 22 rolls up the ramp 54 and onto the trailer floor 10 it rolls directly above the second rear arms 46, which are positioned out of the way beneath the upper surface of the ramp 54. The second greensmower 22 is walked onto the floor 14 and forwardly until the front roller 32 of the second greensmower 22 is positioned within the second bracket 44. The second bracket 44 is fixed with the first rear arms 34 which are in their upright position above the floor 14. With the first rear arms 34 in their upright position the second bracket 44 is positioned for receiving the front roller 32 of the second greensmower 22. The operator can then secure the second greensmower 22 in place by pivoting the second lever 52 downwardly and forwardly to its latched position. As the second lever 52 pivots forwardly, the second shaft 48 and second rear arms 46 pivot therewith until the rubber bumpers 36 are abutable with the rear portion of the second greensmower 22. The second bracket 44 and second rear arms 46 confine the second greensmower 22 in a manner similar to how the first bracket 26 and first rear arms 34 confine the first greensmower 20. The second bracket 44 confines the front roller 32 of the second greensmower 22 and restricts forward and upward movement of the front portion of the second greensmower 22. The rear portion of the second greensmower 22 is relatively heavy, and therefore will not tend to bounce or shift upwardly during transport. Therefore the second rear arms 46 block the second greensmower 22 from shifting rearwardly and do not aggressively confine the rear of the second greensmower 22 in the vertical direction. As the operator swings the second lever 52 forwardly to its latched position, the right and left linkages 60 and 58 pull the ramp 54 upwardly to the position shown in FIG. 1. With the first and second greensmowers 20 and 22 secured in place, the first and second levers 40 and 52 latched, and the ramp 54 raised to the transport position, the operator can pull the trailer 10 to another location to continue mowing operations on the next green.

To unload the greensmowers 20 and 22, the operator first unlatches the second lever 52 and swings the lever 52 upwardly and rearwardly until the ramp 54 contacts the ground 74 and the second rear arms 46 pivot down through the slots 62 and become positioned generally beneath the ramp 54. The second greensmower 22 can then be rolled rearwardly by the operator on the floor 14 of the trailer 10 and down the ramp 54. As the second greensmower 22 is propelled rearwardly it rolls directly above the second rear arms 46, which are positioned beneath the ramp 54. Once the second greensmower 22 has been rolled off the trailer 10, the operator can then unlatch the first lever 40 and swing the first lever 40 upwardly and rearwardly, which causes the first shaft 38 and first rear arms 34 to swing rearwardly. The first rear arms 34 and the second bracket 44 there attached swing downwardly through the slots 72 formed in the trailer floor 14 until they are positioned beneath the surface of the trailer floor 14. The first greensmower 20 can then be rolled rearwardly across the trailer floor 14. Since both levers 40 and 52 are in their raised positions, both pairs of rear arms 34 and 46 are positioned beneath the surface on which the greensmower 20 will roll off the trailer 10. This provides clearance for the first greensmower 20 to roll rearwardly across the floor 14 and down the ramp 54 until the first greensmower 20 is resting on the ground surface 74.

The operation of the trailer 10 according to the present invention is described above as transporting two greensmowers 20 and 22. The trailer 10 can also be used to transport a single greensmower. A single greensmower can be transported in either of two locations on the trailer 10: either on the front of the trailer 10 between the first bracket 26 and first rear arms 34 or on the rear of the trailer 10 between the second bracket 44 and second rear arms 46.

The trailer 10 according to the present invention allows the greensmowers 20 and 22 to be loaded onto the trailer 10 and latched in position relatively quickly and easily. The first and second levers 40 and 52 facilitate simple latching and unlatching of the greensmowers 20 and 22.

The right and left linkages 60 and 58 are described above and shown in the drawings as being rigid links that are pivotally interconnected. These linkages 60 and 58 are designed to include a lost motion feature that allows the second lever 52, second shaft 48 and second rear arms 46 to continue pivoting rearwardly after the ramp 54 has contacted the ground 74. This allows the second rear arms 46 to continue pivoting until they pass through the slots 62 in the ramp 54 and become positioned beneath the ramp 54. Other linkage structures that would provide this lost motion feature, such as chains or cables, could also be utilized instead of the right and left linkages 60 and 58.

As best seen in FIG. 3, when two greensmowers 20 and 22 are carried by the trailer 10, they are laterally offset from each other. The first greensmowers 20 is positioned on the front portion 18 of the trailer 10 and in front of the second greensmower 22, and is offset slightly to the right of the centerline of the trailer 10. The second greensmower 22 is positioned on the rear portion of the trailer 10 and behind the first greensmower 20. The second greensmower 22 is positioned slightly to the left of the centerline of the trailer 10, and therefore is also offset to the left with respect to the first greensmower 20. This lateral offset of the greensmowers 20 and 22 insures that the handle structure 80 of the first greensmower 20, which extends rearwardly and upwardly from the body of the first greensmower 20, will not interfere with or block the second greensmower 22 from being positioned in close proximity behind the first greensmower 20. The handle structure 80 of the first greensmower 20 extends to the side of the front body portion and engine 82 of the second greensmower 22 such that even if the second greensmower 22 has a relatively large body portion 82 it can still be positioned closely behind the first greensmower 20. This allows the two greensmowers 20 and 22 to be positioned in a compact manner on the trailer 10, which allows the trailer 10 to be constructed in a relatively small size. Maneuverability of the trailer 10 is thereby enhanced, and the cost of manufacturing the trailer 10 is correspondingly reduced. The two greensmowers 20 and 22 are offset on either side of the centerline of the trailer 10 by the same distance, and therefore each tire 12 supports generally the same amount of weight when the trailer 10 carries two greensmowers 20 and 22. Therefore stability of the trailer 10 is generally enhanced when the trailer 10 is carrying its greatest load.

The trailer 10 according to the present invention secures a greensmower 20 by confining the greensmower 20 with the front bracket 26 and the rear arm 34. The rear arm 34 swings up to a position whereat it is abutable with the rear of the greensmower 20 for preventing the greensmower 20 from shifting rearwardly. FIG. 2 shows the bumper portion 36 of the first rear arm 34 as being positioned generally above a structural member on the rear of the first greensmower 20. However, the rear arm 34 need not aggressively confine the greensmower 20 in the vertical dimension. The rear portion of the greensmower 20 is relatively heavy, and therefore tends not to bounce up during transport on a trailer. The rear arms 34 are intended to block the greensmower 20 from shifting rearwardly, and the rear arms 34 therefore function to maintain the greensmower's front roller 32 securely positioned within the bracket 26. Since the rear arm 34 need only swing up to a position whereat it blocks the greensmower 20 from shifting rearwardly, the rear arm 34 is not required to abut the greensmower 20 at a precise location. This allows a greensmower 20 to be quickly rolled into position without requiring an operator to precisely position the greensmower from side to side. Also, this allows greensmowers of various sizes to be firmly secured to the present trailer 10, since the rear arms 34 are not required to contact or engage the greensmower 20 at a particular precise location. Furthermore, since the rear arms 34 are not required to abut the greensmower 20 at any particular precise location, the greensmower 20 can be rolled onto the trailer 10 with or without its transport wheels. The rear arms 34 will properly abut the greensmower 20 whether or not the tires are mounted to the central shaft 86 of the greensmower's rear roller 76. The greensmower 20 will abut the rear arms 34 at slightly different locations depending on whether the transport tires are attached or removed from the central shaft 84 of the rear roller 76, but in either instance the rear arm 34 blocks the greensmower 20 from shifting rearwardly, and therefore the greensmower's front roller 32 will remain within the front bracket 26 for preventing the greensmower 20 from rocking backwardly.

The trailer 10 according to the preferred embodiment is shown in the drawings as carrying greensmowers 20 and 22 that can be rolled forwardly onto the floor 14 of the trailer 10 from a ramp 54 that is located at the rear of the trailer 10. However, a trailer could be provided within the scope of the present invention that orients the greensmowers 20 and 22 differently than facing forwardly, or that allows the greensmowers 20 and 22 to be rolled up onto the trailer 10 from a direction other than from the rear. References to front and rear in the claims are with respect to the greensmowers 20 and 22 carried by the trailer 10, not the trailer 10 itself or the trailer's direction of travel.

We claim:

1. A trailer adapted for transporting a walkbehind greensmower, wherein the greensmower includes a ground engaging front roller and a rear ground engaging roller or pair of wheels, said trailer comprising:

a floor upon which the greensmower can be rolled into position for transport, a bracket which receives the front roller of the greensmower such that when the front roller is received by the bracket the bracket blocks forward movement of the front roller and also blocks the front roller from shifting upwardly with respect to the trailer floor, at least one rear arm pivotally coupled with the trailer and being pivotable to a lowered position whereat the rear arm provides clearance for the greensmower to be rolled into position on the floor of the trailer, the rear arm also being pivotable to a raised position whereat the rear arm is abutable with a rear portion of the greensmower for blocking the greensmower from shifting rearwardly.

2. The invention of claim 1, wherein the rear arm pivots to a position beneath the floor of the trailer when in the lowered position to thereby allow the greensmower to be rolled on the floor of the trailer directly above the rear arm in the lowered position.

3. The invention of claim 1, and further comprising a lever operatively coupled with the rear arm and engagable by an operator for swinging the rear arm between the raised and lowered positions.

4. The invention of claim 3, and further comprising a pivotable ramp coupled with the trailer, said ramp being operatively coupled with the lever for pivoting between raised and lowered positions as the lever swings the rear arm between raised and lowered positions, wherein in the raised position the ramp has been swung upwardly for transport and in the lowered position the ramp has been swung downwardly to a lowered position whereat the greensmower can be rolled across the ramp between the floor of the trailer and a ground surface.

5. The invention of claim 2, and further comprising a lever operatively coupled with the rear arm and engagable by an operator for swinging the rear arm between the raised and lowered positions.

6. The invention of claim 5, and further comprising a pivotable ramp coupled with the trailer, said ramp being operatively coupled with the lever for pivoting between raised and lowered positions as the lever swings the rear arm between raised and lowered positions, wherein in the raised position the ramp has been swung upwardly for transport and in the lowered position the ramp has been swung downwardly to a lowered position whereat the greensmower can be rolled across the ramp between the floor of the trailer and a ground surface.

7. A trailer adapted for transporting first and second walkbehind greensmowers, wherein the greensmowers each include a ground engaging front roller and a rear ground engaging roller or pair of wheels, said trailer comprising:

a floor upon which the first greensmower can be rolled into position in front of the second greensmower for transport, a first bracket which receives the first greensmower's front roller such that when the first greensmower's front roller is received by the first bracket the first bracket blocks forward movement of the first greensmower's front roller and also blocks the first greensmower's front roller from shifting upwardly with respect to the trailer floor, at least one first rear arm pivotally coupled with the trailer and being pivotable to a lowered position whereat the first rear arm provides clearance for the first greensmower to be rolled into position on the floor of the trailer, the first rear arm also being pivotable to a raised position whereat the first rear arm is abutable with a rear portion of the first greensmower for blocking the first greensmower from shifting rearwardly, a second bracket positioned behind the first greensmower, said second bracket receives the second greensmower's front roller such that when the second greensmower's front roller is received by the second bracket the second bracket blocks forward movement of the second greensmower's front roller and also blocks the second greensmower's front roller from shifting upwardly with respect to the trailer floor, at least one second rear arm pivotally coupled with the trailer and being pivotable to a lowered position whereat the second rear arm provides clearance for the first and second greensmower to be rolled into position on the floor of the trailer, the second rear arm also being pivotable to a raised position whereat the second rear arm is abutable with a rear portion of the second greensmower for blocking the second greensmower from shifting rearwardly.

8. The invention of claim 7, wherein the rear arms pivot to a position beneath the floor of the trailer when in the lowered positions to thereby allow the first and second greensmowers to be rolled onto the floor of the trailer directly above the rear arms in the lowered position.

9. The invention of claim 7, and further comprising a first lever operatively coupled with the first rear arm and engagable by an operator for swinging the first rear arm between the raised and lowered positions, and a second lever operatively coupled with the second rear arm and engagable by an operator for swinging the second rear arm between the raised and lowered positions.

10. The invention of claim 9, and further comprising a pivotable ramp coupled with the trailer, said ramp being operatively coupled with the second lever for pivoting between raised and lowered positions as the second lever swings the second rear arm between raised and lowered positions, wherein in the raised position the ramp is swung upwardly for transport and in the lowered position the ramp is swung downwardly to a lowered position whereat the greensmowers can be rolled across the ramp between the floor of the trailer and a ground surface.

11. The invention of claim 7, wherein said greensmowers are laterally staggered with respect to each other when positioned on the floor of the trailer for transport.

12. The invention of claim 7, wherein the second bracket is fixed with the first rear arm for pivotal motion therewith.

13. The invention of claim 8, and further comprising a first lever operatively coupled with the first rear arm and engagable by an operator for swinging the first rear arm between the raised and lowered positions, and a second lever operatively coupled with the second rear arm and engagable by an operator for swinging the second rear arm between the raised and lowered positions.

14. The invention of claim 13, and further comprising a pivotable ramp coupled with the trailer, said ramp being operatively coupled with the second lever for pivoting between raised and lowered positions as the second lever swings the second rear arm between raised and lowered positions, wherein in the raised position the ramp is swung upwardly for transport and in the lowered position the ramp is swung downwardly to a lowered position whereat the greensmowers can be rolled across the ramp between the floor of the trailer and a ground surface.

15. The invention of claim 14, wherein said greensmowers are laterally staggered with respect to each other when positioned on the floor of the trailer for transport.

16. The invention of claim 15, wherein the second front bracket is fixed with the first rear arm for pivotal motion therewith.

17. The invention of claim 11, wherein the second bracket is fixed with the first rear arm for pivotal motion therewith.

18. The invention of claim 17, and further comprising a first lever operatively coupled with the first rear arm and engagable by an operator for swinging the first rear arm between the raised and lowered positions, and a second lever operatively coupled with the second rear arm and engagable by an operator for swinging the second rear arm between the raised and lowered positions.

19. The invention of claim 18, and further comprising a pivotable ramp coupled with the trailer, said ramp being operatively coupled with the second lever for pivoting between raised and lowered positions as the second lever swings the second rear arm between raised and lowered positions, wherein in the raised position the ramp is swung upwardly for transport and in the lowered position the ramp is swung downwardly to a lowered position whereat the greensmowers can be rolled across the ramp between the floor of the trailer and a ground surface.

* * * * *